S. REISER.
LOCKING DEVICE FOR MOTOR VEHICLES.
APPLICATION FILED NOV. 26, 1917.
1,260,051.
Patented Mar. 19, 1918.
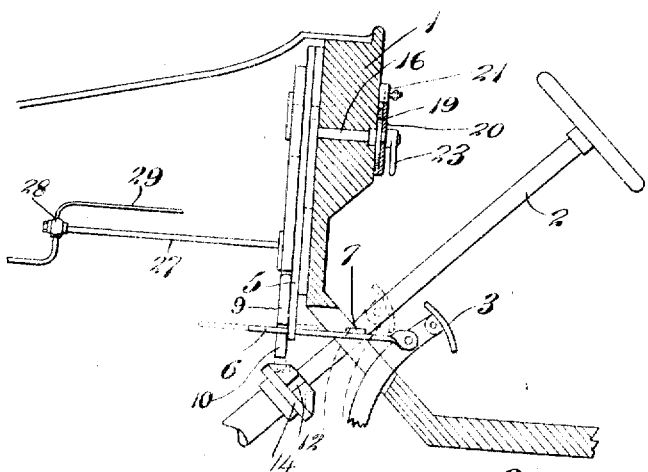
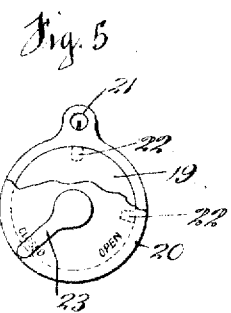
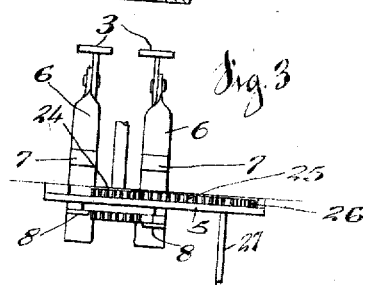
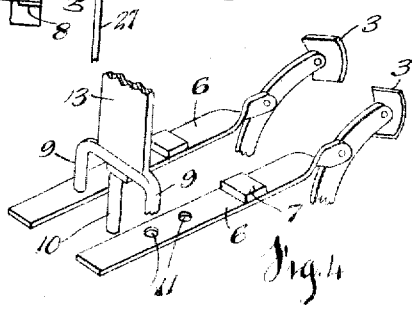
Inventor
Sigmund Reiser
by
Oliver L. Garman
Attorney

UNITED STATES PATENT OFFICE.

SIGMUND REISER, OF CINCINNATI, OHIO.

LOCKING DEVICE FOR MOTOR-VEHICLES.

1,260,051.  Specification of Letters Patent.  Patented Mar. 19, 1918.

Application filed November 26, 1917. Serial No. 203,919.

*To all whom it may concern:*

Be it known that I, SIGMUND REISER, a citizen of the United States, and a resident of Cincinnati, in the county of Hamilton and State of Ohio, have invented certain new and useful Improvements in Locking Devices for Motor-Vehicles, of which the following is a full, clear, and exact description, reference being had to the accompanying drawing, forming a part of this specification.

My invention relates to locking devices for motor vehicles and has for its object to provide a lock for several of the operating mechanisms of the vehicle so that the same can not be moved without the knowledge or consent of the owner.

Another object of the invention is to provide a device for locking a vehicle of the character mentioned which locks the pedals for moving the brake and clutch mechanism and at the same time locks the steering column and gasolene supply, all of which are controlled by a single actuating mechanism.

A still further object of my invention is to provide a simple locking device which is inexpensive to manufacture and install, and one which is neat in appearance and efficient in its use.

In the drawings:

Figure 1 is an elevation of a device constructed in accordance with my invention and applied to a motor vehicle only those parts of the vehicle being shown which are immediately adjacent the device.

Fig. 2 is a front elevation of my invention.

Fig. 3 is a top plan view of my invention.

Fig. 4 is a perspective of a part of my invention.

Fig. 5 is a view showing the lock employed together with the operating handle of the device.

Referring more particularly to the drawings 1 represents the body of a motor vehicle and 2 the steering column thereof. The customary clutch and brake pedals 3 operate through openings 4 in the floor of the vehicle in the ordinary manner as shown. A base plate 5 is provided which is mounted immediately in front of the dash of the vehicle body and is mounted thereon and is provided with apertures in the lower part thereof through which locking bars 6 operate, these openings serving as bearings and guides for said bars. The locking bars 6 are attached at one end to the pedals 3 so that when the pedals are thrust forwardly the bars are slid through the apertures in the base plate until the stop 7 on the bars strike the plate 1.

A sliding vertical plunger plate 13 is mounted on the base plate and is guided by suitable guides 8 and is provided with plunger bars 9 and 10, the plungers 9 being adapted to enter apertures 11 in the locking bars 3 and the plunger 10 being adapted to enter the depressions or slots 12 in the steering column, said steering column being preferably provided with a collar 14 having slots for this purpose. The plunger plate is provided with an elongated slot 15 through which a shaft 16 operates. The shaft is mounted in the dash of the vehicle body and has a pinion gear 17 mounted on one end thereof which is adapted to engage a gear rack 18 mounted on the vertical sliding plunger plate 13. Thus when the pinion gear is operated the plunger plate is raised or lowered. The other end of the pinion shaft 16 is provided with a disk 19 over which a shell or cover 20 is mounted, the cover however being mounted rigidly on the front of the dash of the vehicle body and the disk 19 being rotatable with the pinion shaft 16. A lock 21 is mounted in the cover plate 20 and is provided with the ordinary plunger or plungers which are adapted to enter slots 22 in the periphery of the disk 19. Two slots 22 are preferably provided in order to provide a positive position for the open and closed positions of the locking device and further to prevent the locking device to be jarred from the open position when the car or vehicle is being operated.

A lever or handle 23 is mounted on the pinion shaft 16 to provide means for operating the locking device and indicating marks may be provided on the face of the cover plate for the convenience of the operator.

Situated between the base plate 1 and the dash of the vehicle I provide a series of gears which operate the valve rod connecting with the valve of the gasolene supply. The pinion gear shaft 16 operates a gear 24 which is tightly mounted thereon and this gear meshes with an idler gear 25 which in turn meshes with a gear 26 mounted on the valve rod 27 which connects with the valve stem of the valve or pet cock 28 in the pipe line 29 which supplies the carbureter of the vehicle. The idler gear is mounted in suitable bearings in the base plate and the valve rod 27 is also suitably mounted therein.

The operation of the device is as follows: When it is desired to lock the operating mechanism of the vehicle the operator turns the operating handle 23 to closed or locked position after having pushed the pedals of the machine forward to their limit of movement. If desired however the pedals may be locked in their normal position there being holes 11 provided in the locking bars 6 for locking the pedals in either position. Upon turning the lever or handle the pinion shaft 16 is rotated thereby rotating the pinion gear 17 and lowering the plunger plate 13 thereby lowering the plungers 10 and 11 into engagement with the locking bars and steering column respectively thus locking them against movement. The idler gear is also operated by the gear 24 and the gear 26 which is fixed on the valve rod 27 is also operated which in turn operates the valve 28 thereby closing the gasolene supply.

It will be evident that modifications of my invention may be made without departing from its spirit and scope and I do not wish to be confined to the exact details shown.

What I claim as new and desire to secure by Letters Patent is:

1. In combination with a motor vehicle having a steering column and pedals for controlling the operating parts of said vehicle, of a plate mounted on said vehicle, a plurality of plungers mounted on said plate and slidable thereon, bars connected to said pedals, said bars having apertures arranged to be engaged by certain of said plungers, means on said steering column whereby one of said plungers is adapted to engage and lock the same, and mechanism for operating said plungers.

2. In combination with a motor vehicle having a steering column and pedals for controlling the operating parts of said vehicle, a fuel supply line having a valve therein, of a plate mounted on said vehicle, a slidable plunger plate on said plate, said plunger plate having a plurality of plungers extending downwardly therefrom, bars connected to the pedals of the vehicle having apertures adapted to be engaged by the said plungers, means on the steering column adapted to be engaged by one of said plungers, a valve rod connected to said valve, mechanism for operating the plungers and valve rod simultaneously substantially as set forth.

3. A mechanism of the character described comprising pedals, bars connected to said pedals having apertures therein, a plate rigidly mounted having bearings for said bars, a plurality of plungers slidably mounted on said plate, a steering column, means thereon, whereby one of the plungers is adapted to engage and lock the steering column against movement, mechanism for operating said plungers to cause the same to engage the apertures in said bars and the means on said steering column respectively to secure the same against movement, a lock for said mechanism, a fuel supply line, a valve in said fuel supply line, and mechanism whereby said valve is opened and closed with the operation of the said plungers, substantially as set forth.

4. A mechanism of the character described comprising a pair of pedals, a steering column, a fuel supply line, a valve therein, a vertically disposed plunger plate, plungers thereon, mechanism for raising and lowering said plungers, a lock for said mechanism, means whereby said steering column and said pedals are engaged by said plungers when lowered, and means coöperating therewith whereby said valve is controlled simultaneously with the movement of said plungers.

SIGMUND REISER.